US010817577B2

(12) United States Patent
Boccon-Gibod (10) Patent No.: US 10,817,577 B2
(45) Date of Patent: *Oct. 27, 2020

(54) PERSONALIZED DATA MANAGEMENT SYSTEMS AND METHODS

(71) Applicant: Intertrust Technologies Corporation, Sunnyvale, CA (US)

(72) Inventor: Gilles Boccon-Gibod, San Francisco, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 15/654,332

(22) Filed: Jul. 19, 2017

(65) Prior Publication Data

US 2018/0011938 A1 Jan. 11, 2018

Related U.S. Application Data

(63) Continuation of application No. 14/074,603, filed on Nov. 7, 2013, now Pat. No. 9,734,249.
(Continued)

(51) Int. Cl.
*G06F 16/30* (2019.01)
*G06F 16/9535* (2019.01)

(52) U.S. Cl.
CPC .................. *G06F 16/9535* (2019.01)

(58) Field of Classification Search
CPC .................. G06F 17/30867; G06F 16/9535
(Continued)

(56) References Cited

U.S. PATENT DOCUMENTS 8,234,387 B2 7/2012 Bradley et al.
2007/0180519 A1 8/2007 Boccon-Gibod et al.
(Continued)

FOREIGN PATENT DOCUMENTS

EP          1524580 A2   4/2005
WO   WO 2007130150 A2  11/2007

OTHER PUBLICATIONS

PCT Patent Application US2013/068992 filed Nov. 7, 2013; International Search Report and Written Opinion dated Feb. 25, 2014.
(Continued)

*Primary Examiner* — Sana A Al-Hashemi
(74) *Attorney, Agent, or Firm* — Finnegan, Henderson, Farabow, Garrett & Dunner, LLP (57) ABSTRACT

This disclosure relates to systems and methods for managing data associated with a user using a personalized cloud storage platform operating as a centralized repository for user data generated from a variety of sources and/or user devices. By centralizing the storage and/or management of personal data that would conventionally be confined between multiple information silos, embodiments of the systems and methods disclosed herein may improve the ability of a user to control their personal data, facilitate utilization of their personal data in a variety of ways not offered by services associated with the silos, and/or allow a user to centrally manage their personal data. Further embodiments disclosed herein allow a user to define one or more policies or other rules associated with personal data stored in their personal cloud.

20 Claims, 8 Drawing Sheets

Related U.S. Application Data (60) Provisional application No. 61/723,566, filed on Nov. 7, 2012.

(58) Field of Classification Search
USPC ....... 707/607, 609, 687, 705, 769, 790, 813, 707/821
See application file for complete search history.

(56) References Cited

U.S. PATENT DOCUMENTS

| | | |
|---|---|---|
| 2008/0082480 A1 | 4/2008 | Gounares et al. |
| 2008/0091613 A1 | 4/2008 | Gates et al. |
| 2010/0199098 A1 | 8/2010 | King |
| 2010/0293049 A1 | 11/2010 | Maher et al. |
| 2011/0055933 A1 | 3/2011 | Ishiguro |
| 2013/0096943 A1 | 4/2013 | Carey et al. |
| 2013/0166322 A1* | 6/2013 | Woods .................. G06F 19/328 705/3 |
| 2013/0262638 A1* | 10/2013 | Kumarasamy ........ G06F 15/177 709/221 |
| 2014/0007222 A1* | 1/2014 | Qureshi .................... G06F 8/53 726/16 |

OTHER PUBLICATIONS

European Patent Application 13853307.0 filed Nov. 7, 2013; Extended European Search Report dated Oct. 8, 2015.
First Chinese Office Action and English translation dated Mar. 3, 2017 for Patent Application No. 2013-80069682.5 (15 pages), 15 pages.

* cited by examiner

PERSONALIZED DATA MANAGEMENT SYSTEMS AND METHODS

RELATED APPLICATIONS

This application is a continuation of U.S. application Ser. No. 14/074,603, filed Nov. 7, 2013, now allowed, and entitled "PERSONALIZED DATA MANAGEMENT SYSTEMS AND METHODS," which claims the benefit of priority under 35 U.S.C. §119(e) to U.S. Provisional Patent Application No. 61/723,566, filed Nov. 7, 2012, and entitled "PERSONALIZED DATA MANAGEMENT SYSTEMS AND METHODS," both of which are hereby incorporated by reference in their entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

Mobile devices have become an important part of our lives. People often carry mobile devices wherever they go and customize devices according to their personal preferences, environment, and/or habits. Modern mobile devices typically include various types of sensors and other data input components. These sensors gather data about the environment surrounding the mobile device and/or the user of the mobile device, and may provide information regarding device location, motion, and/or other activities. A user may also utilize a mobile device in connection with a variety of applications. Monitoring such interactions may provide additional information regarding a user's activities.

Information associated with a user collected by mobile devices and/or applications executing thereon may be transmitted to remote storage systems associated with the devices and applications. Conventionally, each device and/or each application may be associated with its own discrete remote storage system. Thus, information collected by devices and/or applications may be locked into a plurality of discrete remote storage systems or logical information silos. For example, information collected by a fitness application executing on a mobile phone may be stored by a first remote storage system associated with the application (a first information silo) and information collected by a tablet computer may be stored by a second remote storage system associated with the tablet computer (a second information silo). Users may lack control of information stored by discrete remote storage systems of different silos associated with their devices and/or applications. Moreover, users may be unable to utilize information collected by different devices and/or applications in ways not offered by providers of the devices and/or applications, and may similarly be unable to aggregate information between silos and/or collected by a plurality of their devices and/or applications.

Systems and methods are disclosed herein for managing data associated with a user. In some embodiments, systems and methods are provided for managing data associated with a user using a personalized cloud storage platform operating as a centralized repository for user data generated from a variety of sources and/or user devices. In certain embodiments, the personal cloud storage platform may operate as a centralized repository for user data generated from a variety of sources and/or devices associated with a user. Embodiments of the personal cloud storage platform disclosed herein may allow for user-centric control of personal data. For example, by centralizing the storage and/or management of personal information that would conventionally be confined to multiple information silos, embodiments of the systems and methods disclosed herein may improve the ability of a user to control their personal data across information silos, facilitate utilization of their personal data in a variety of ways not offered by services associated with the silos, and allow a user to centrally manage personal data collected from a variety of sources and/or devices using one or more policies. A user may further be able to retain certain personal data for future use that may otherwise be lost in the event a service associated with an information silo terminates its operation.

In some embodiments, systems and methods disclosed herein can be used to provide a personal cloud storage platform that allows a user to utilize personal data collected from different devices and/or sources in connection with a variety of applications. For example, certain embodiments may provide for an application store in which users may select, purchase, and/or execute applications for use in connection with their personal data stored in their personal cloud. Such applications may be provided by the user for use in connection with their personal data and/or offered by one or more third parties. For example, a third party software provider may have developed an application that utilizes personal data associated with users to provide certain valuable results, but may not have the data collection infrastructure in place to facilitate use of their application. By offering their application in connection with a personal cloud storage platform, the developer may leverage existing personal data collection channels (e.g., devices and/or other sources) to provide valuable services to a user not otherwise available to the user in connection with individual information silos.

In some embodiments, a user may define one or more policies or other rules associated with personal data stored in their personal cloud. The one or more policies may articulate how personal data stored and/or managed by the personal cloud may be used and/or distributed. Such policies or rules can be articulated and implemented using any suitable mechanism. Policies or rules may define, among other things, how personal data may be utilized by one or more applications associated with the personal cloud storage platform and/or how personal data or other information derived therefrom may be distributed from the personal cloud storage platform (e.g., shared with one or more other users and/or third parties). By enabling a user to define policies or rules associated with their personal data through a personal cloud storage platform consistent with embodiments disclosed herein, control of the personal data associated with the user may be more centralized and the use of such personal data may be better managed.

Certain embodiments of the systems and methods disclosed herein may be integrated into a variety of devices and/or applications executing on user devices (e.g., using a suitable software development kit ("SDK") or the like). Embodiments of the disclosed systems and methods may be integrated into devices and/or applications using one or more trusted components installed at a time of manufacture and/or via download by a user. The one or more trusted components may utilize common interfaces for the collection and transmission of personal data collected by devices and/or applications to a personal cloud storage platform associated with a user. The personal cloud storage platform may be implemented in any suitable manner. For example, in some embodiments a user's personal cloud storage may comprise a partition of a cloud storage platform in which the data of multiple users is also stored. Alternatively, or in addition, the physical storage used to implement a user's personal cloud storage may be distributed over multiple remote and/or local computer systems and/or storage locations, and may comprise a virtual or logical grouping of data. In other embodiments, a user's personal data may be stored in the storage of a single remote system or cluster or farm of systems.

BRIEF DESCRIPTION OF THE DRAWINGS

The inventive body of work will be readily understood by referring to the following detailed description in conjunction with the accompanying drawings, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Systems and methods are presented for facilitating management of personal data associated with a user. In one embodiment, a personal cloud storage platform is used. In certain embodiments, the systems and methods described herein can, for example, be used in connection with digital rights management ("DRM") technologies such as described in commonly assigned, co-pending U.S. patent application Ser. No. 11/583,693, "Digital Rights Management Engine Systems and Methods," filed Oct. 18, 2006 and published as U.S. Pub. No. 2007/0180519 A1 ("the '693 application"), and/or service orchestration and DRM technologies such as those described in commonly assigned U.S. Pat. No. 8,234,387, "Interoperable Systems and Methods for Peer-to-Peer Service Orchestration" ("the '387 patent"), genetic information storage and/or management technologies such as those described in commonly assigned co-pending U.S. patent application Ser. No. 13/654,349 ("the '349 application"), and/or content delivery technologies such as those described in commonly assigned co-pending U.S. patent application Ser. No. 12/785,406 ("the '406 application") (the contents of '693 application, the '387 patent, the '349 application, and the '406 application hereby being incorporated by reference in their entireties), as well as in other contexts. It will be appreciated that these systems and methods are novel, as are many of the components, systems, and methods employed therein.

Figure 1:
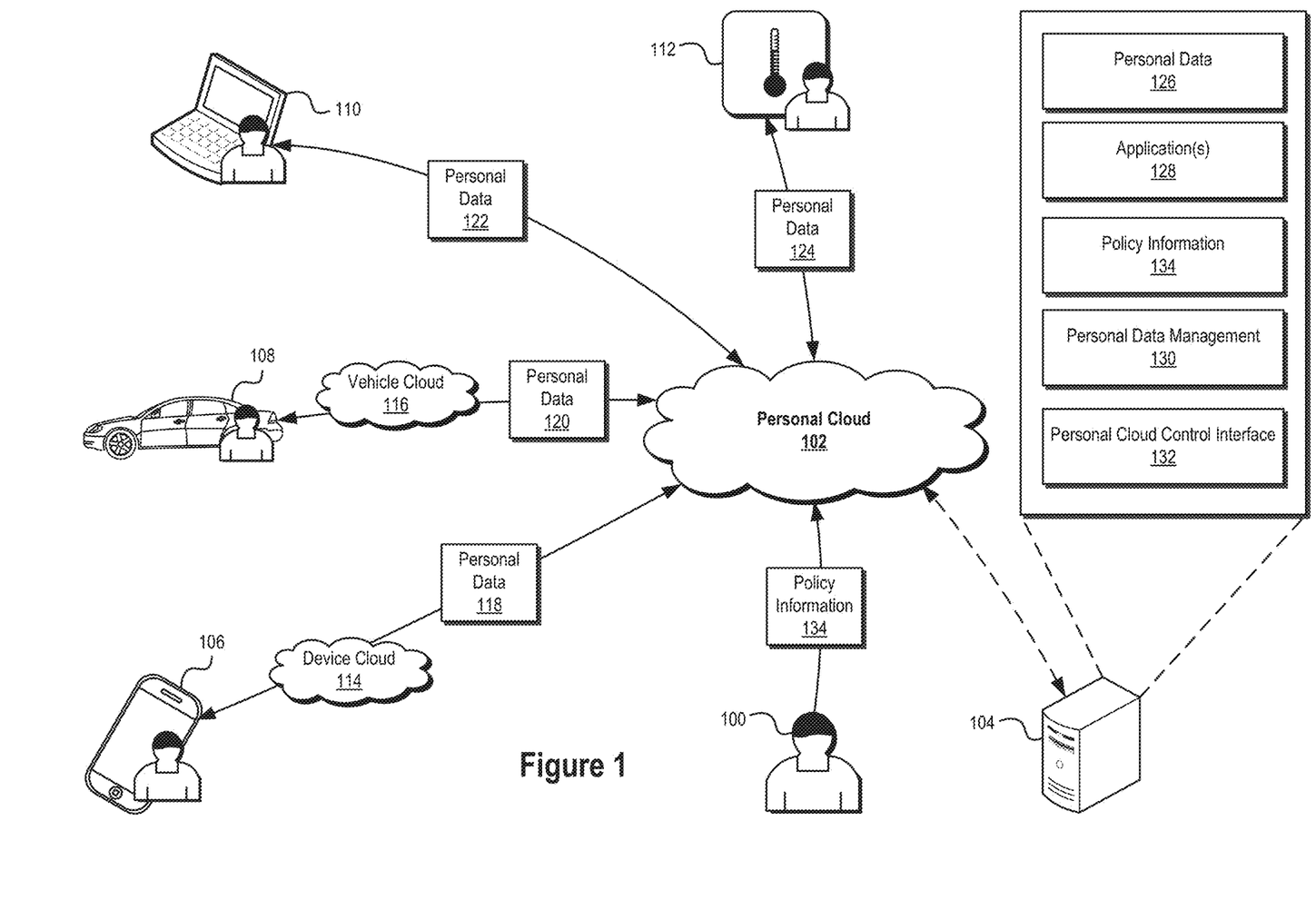
FIG. 1 illustrates an exemplary architecture implementing a personal cloud storage platform consistent with embodiments of the present disclosure.

FIG. 1 illustrates an exemplary architecture implementing a personal cloud storage platform 102 associated with a user 100 consistent with embodiments of the present disclosure. The personal cloud storage platform 102 may be associated with a personal cloud management system 104 that may implement certain features of the personal cloud storage platform 102. Although illustrated as separate systems, in certain embodiments, the personal cloud storage platform 102 and/or the personal cloud management system 104 may comprise a single computing system. In further embodiments, the personal cloud storage platform 102 and/or the personal cloud management system 104 may comprise any suitable number and/or combination of computing systems.

A variety of systems and/or devices 106-112 (and/or applications running thereon) associated with the user 100 may be communicatively coupled to the personal cloud storage platform 102 and/or the personal cloud management system 104. For example, a mobile device 106, a connected vehicle 108 and/or a system included therein, (e.g., a telematics system and/or an in-vehicle-infotainment ("IVI") system), a laptop computer system 110, a connected thermostat 112, a fitness application running on a mobile device, and/or the like may be communicatively coupled with the personal cloud storage platform 102 and/or the personal cloud management system 104. A variety of other systems, programs, and/or devices may be communicatively coupled with the personal cloud storage platform 102 and/or the personal cloud management system 104 including, without limitation, a wireless communication device (e.g., a cellular telephone), a smartphone, a tablet computer, a wireless control device (e.g., keyless entry or remote start devices, etc.), a gaming or other entertainment device, a fitness tracking device, a smart watch, a connected vehicle (e.g., a passenger vehicle, aircraft, boat, train, etc.), a connected appliance (e.g., a refrigerator, range, air conditioning unit, furnace, smoke detector, etc.), a consumer electronic device (e.g., a bathroom scale, digital camera, etc.), an advertising or offer targeting application, a social networking application, an Internet search application, a health monitoring application, a home automation system, and/or any other computing system, program or application, and/or device that may be utilized in connection with the disclosed systems and methods.

The systems and/or devices 106-112, user 100, personal cloud storage platform 102, and/or personal cloud management system 104 may be communicatively coupled via one or more network connections. The network connections may comprise a variety of network communication devices and/or channels and may utilize any suitable communications protocols and/or standards facilitating communication between the connected devices and systems. The network connections may comprise the Internet, a local area network, a virtual private network, and/or any other communication network utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards, Bluetooth®, ultra-wide band ("UWB"), Zigbee®, and/or any other suitable technology or technologies.

The systems and/or devices 106-112, personal cloud storage platform 102, and/or personal cloud management system 104 may comprise any suitable computing system or systems configured to implement embodiments of the systems and methods disclosed herein. In certain embodiments, the systems and/or devices 106-112, personal cloud storage platform 102, and/or personal cloud management system 104 may comprise at least one processor system configured to execute instructions stored on an associated non-transitory computer-readable storage medium. As discussed in more detail below, the systems and/or devices 106-112, personal cloud storage platform 102, and/or personal cloud management system 104 may, in some embodiments, further comprise a secure processing unit ("SPU") configured to perform sensitive operations such as trusted credential and/or key management, secure policy management, and/or other aspects of the systems and methods disclosed herein. The systems and/or devices 106-112, personal cloud storage platform 102, and/or personal cloud management system 104 may further comprise software and/or hardware configured to enable electronic communication of information between the devices and/or systems 102-112 via one or more associated network connections.

The systems and/or devices 106-112 (and/or applications running on such systems and/or devices) may be configured to collect personal data 118-124 relating to the systems and/or devices 106-112, applications running thereon, and/or the user 100. In certain embodiments, the systems and/or devices 106-112 may utilize one or more associated sensor systems configured to measure data 118-124 relating to the user 100. For example, the systems and/or devices 106-112 may include, without limitation, one or more accelerometers, Global Positioning System ("GPS") sensors, acoustic sensors, infra-red sensors, imaging sensors, gyroscopes, proximity sensors, light sensors, temperature sensors, magnetometers, cameras, wireless communication systems, and/or any other suitable system and/or sensors for detecting and/or measuring information associated with the systems and/or devices 106-112, their surroundings, and/or the user 100. Certain sensors of systems and/or devices 106-112 may be location-based sensors configured to generate personal data 118-124 relating to a location of the systems and/or devices 106-112 and/or user 100. Further sensors may be activity-based and/or other environmental sensors configured to provide personal data 118-124 relating to a usage of the systems and/or devices 106-112 (e.g., application usage information or the like) and/or an environment proximate to the systems and/or devices 106-112. In certain embodiments, the one or more sensors of the systems and/or devices 106-112 may collect personal data 118-124 that provides contextual information that may be used to determine and/or infer certain personal information relating to the user 100 (e.g., interests, regularly visited points of interest, etc.). For example, if an accelerometer of mobile device 106 indicates that the device 106 does not move on average between 11:00 PM and 6:00 AM every day, it may be inferred that the user 100 typically sleeps between these hours.

Personal data 118-120 collected by systems and/or devices 106-112 may be communicated to one or more device-specific and/or application-specific cloud storage systems 114-116 and/or the personal cloud storage platform 102. For example, as illustrated, the mobile device 106 may be associated with a device cloud storage system 114 as part of a device-specific information silo. Personal data 118 generated by the mobile device 106 may be communicated to the device cloud 114 for storage and/or use by a service provider associated with the device cloud 114. An application executing on the mobile device 106 (e.g., a fitness application, a social networking application, an Internet search application, an offer targeting application, a reservation management application, etc.) may be associated with an application-specific cloud storage system configured to store personal data generated by the application as part of an application-specific information silo associated with an application server provider (e.g., a fitness-related service provider, a social network, a search engine, etc.). Similarly, personal data 120 generated by the connected vehicle 108 and/or a system included therein, (e.g., a telematics system and/or an IVI system) may be communicated to a vehicle-specific cloud 116 for storage and/or use by a service provider associated with the vehicle cloud 116.

Personal data 118-120 stored solely by device-specific and/or application-specific cloud storage systems 114-116 may have limited use outside device and/or application specific contexts associated with the device-specific and/or application-specific cloud storage systems 114-116. Moreover, a user 100 may have limited control of personal data stored by device-specific and/or application-specific cloud storage systems 114-116. Accordingly, consistent with embodiment's disclosed herein, personal data 118-120 stored by the device-specific and/or application-specific cloud storage systems 114-116 may be communicated to the personal cloud storage platform 102. The personal cloud storage platform 102 may operate as a centralized repository for personal data generated from a variety of sources and/or devices associated with a user. By centralizing the storage and/or management of personal data 118-120 with the personal cloud storage platform 102, the user 100 may be better able to control their personal data 118-120, utilize their personal data 118-120 in ways not offered by the device-specific and/or application-specific cloud storage systems 114-116, and centrally manage the use and/or distribution of their personal data 118-120 to other users and/or services. It will be appreciated that while reference is made to central management of data, it will be appreciated that the data itself, and/or the systems that perform the management thereof, may, in some embodiments, be physically distributed, and thus, unless otherwise clear from the context, central management as used herein refers to centralization in a virtual or logical sense, and does not necessarily require the physically remote and centralized aggregation of data, although such embodiments are also within the scope of the present disclosure.

In certain embodiments, personal data 122-124 may be communicated directly from devices 110-112 to the personal cloud storage platform 102. For example, as illustrated, personal data 122 generated by a laptop computer system 110 may be communicated directly from the laptop computer system 110 to the personal cloud storage platform 102 (i.e., without being stored at an intermediate device-specific and/or application specific cloud storage system). Similarly, personal data 124 generated by a connected thermostat 112 may be communicated from the connected thermostat 112 to the personal cloud storage platform 102. In further embodiments, personal data 118-124 may be communicated to both the personal cloud storage platform 102 and/or one or more device-specific and/or application-specific cloud storage systems 114-116. For example, although not illustrated, personal data 118 generated by mobile device 106 may be communicated from the device 106 to both the device cloud storage system 114 and the personal cloud storage platform 102.

In certain embodiments, systems and devices 106-112 and/or device-specific and/or application-specific cloud storage systems 114-116 may interface with the personal cloud storage platform 102 using one or more common interfaces for the collection and transmission of personal data 118-124. In certain embodiments, such common interfaces may be facilitated by one or more trusted software components operating on the systems and devices 106-112, device-specific and/or application-specific cloud storage systems 114-116, and/or the personal cloud storage platform 102. In some embodiments, such capabilities may be included in the systems and devices 106-112 and/or device-specific and/or application-specific cloud storage systems 114-116 at a time of manufacture. In further embodiments, one or more downloadable software components and/or plug-ins may enable systems and devices 106-112 or applications executing thereon and/or device-specific and/or application-specific cloud storage systems 114-116 to communicate collected personal data 118-124 to the personal cloud storage platform 102. In this manner, a user 100 may customize distribution channels of their personal data.

In some embodiments, personal data 118-124 may be collected, stored, maintained, and/or managed by a personal agent, such as that described in the '406 application, operating locally on a user's device (e.g., systems and devices 106-112) and/or on a trusted remote system. For example, a personal agent may be implemented as an agent that runs locally on a device such as a background service configured to monitor events and collect information from a variety of sources including, for example, direct user input, user content, user actions, web browsing and/or searches, and/or the like. In certain embodiments, a personal agent may be implemented as a network service that interacts with services (e.g., social networks and/or the like) associated with the user 100 and collects information related to a user profile, friends, groups, recommendations, and/or the like.

In further embodiments, a personal agent may be a distributed software component that works for an individual user 100 and is controlled by that user 100. The personal agent may be a distributed component because it may comprise software that runs on various devices (e.g., systems and devices 106-112) associated with a user as well as on secure systems in the cloud that host personal agent capabilities (e.g., trusted systems such as device-specific and/or application-specific cloud storage systems 114-116, personal cloud management system 104, etc.). In some embodiments, a user 100 may be associated with a plurality of personal agents.

Personal data 118-124 received by the personal cloud storage platform 102 may be collected and stored by the personal cloud storage platform 102 and/or an associated personal cloud management system 104 as personal data 126. The personal data 126 stored and/or managed by the personal cloud storage platform 102 and/or an associated personal cloud management system 104 may be utilized in connection with a variety of applications 128. The applications 128 may, among other things, allow a user 100 to extract value from their personal data 126 that, in certain circumstances, may not be offered by device-specific and/or application-specific service providers. As discussed in more detail below in reference to FIG. 2, applications 128 may be provided by a user 100 and/or by one or more application service providers offering applications to a user (e.g., through an application store associated with the personal cloud storage platform 102).

In certain embodiments, the applications 128 may comprise one or more algorithms configured to provide certain results to the user based on their personal data 126. For example, one or more of the applications 128 may be configured to generate and provide one or more visualizations to the user 100 based on the personal data 126. In further embodiments, one or more of the applications 128 may allow a user 100 to perform certain analytics using the personal data 126. It will be appreciated that a wide variety of applications 128 may be utilized in connection with the personal data 126 managed by the personal cloud storage platform 102, and that any application implementing any method and/or algorithm utilizing the personal data 126 may be used in connection with the embodiments disclosed herein.

In some embodiments, the user 100 may define one or more policies 134 or other rules associated with personal data 126 stored and/or managed by the personal cloud storage platform 102. The policies 134 may, among other things, govern how the personal data 126 may be used (e.g., used by the personal cloud management system 104) and/or distributed from the personal cloud storage platform 102 (e.g., distributed to other users and/or services). Such policies 134 or rules can be implemented using any suitable mechanism including, for example, using the digital rights management techniques described in the '387 patent and the '693 application. Exemplary policies that may be implemented by the systems and methods disclosed herein may include, without limitation, policies regarding what personal data 126 may be collected by the personal cloud storage platform 102 and how such personal data 126 is collected (e.g., what types of personal data 126 is collected, the conditions under which the personal data 126 is collected, etc.), how the personal data 126 may be used and/or distributed, limitations on collection of personal data 126 (e.g., how many days of personal data 126 should be collected, how long it should be retained, size limits on collected personal data 126, whether users can set/modify these limits, whether users can opt-in/opt-out of collection activities, and/or any other desired limitations), and/or the like.

In certain embodiments, policies 134 may be enforced by a personal data management module 130 executing on the personal cloud management system 104. Using the personal data management module 130, a user may define, change, and/or otherwise manage policies 134 associated with their collected personal data 126. In some embodiments, the personal data management module 130 may implement a personal agent for use in connection with the management of personal data 126 and/or associated policies 134. The personal data management module 130 may further enable a user to view and/or otherwise interact with personal data 126 managed by the personal cloud storage platform 102. By allowing for centralized management of personal data 126 associated with a user 100 collected from a variety of user systems and devices 106-112 and/or associated applications, embodiments of the systems and methods disclosed herein may significantly enhance a user's ability to control their personal data 126.

In some embodiments, a user 100 may interact with the personal cloud storage platform 102 and/or the personal cloud management system 104 via a personal cloud control interface 132. For example, the personal cloud control interface 132 may enable a user 100 to interact with one or more applications 128 utilizing their collected personal data 126 and/or a personal data management module 130 in connection with managing their personal data 126. In certain embodiments, a user 100 may interact with the personal cloud control interface 132 via an application associated with the personal cloud storage platform 102 executed on a remote computing system and/or device (e.g., via a personal cloud application executing on a mobile device 106, a laptop computer system 110, and/or the like). In further embodiments, a user 100 may interact with the personal cloud control interface 132 via a web interface. It will be appreciated that a user may interact with the personal cloud control interface 132, the personal cloud storage platform 102, and/or the personal cloud management system 104 in a variety of ways, and that any suitable mechanism may be used in connection with the embodiments disclosed herein.

In some embodiments, applications 128 associated with the personal cloud storage platform 102 may utilize personal data associated with one or more other users or groups of users. For example, one or more other users (not shown) may allow certain access and/or distribution of their personal data in connection with one or more applications 128 associated with the personal cloud storage platform 102 (e.g., as articulated by one or more policies associated with the other user's personal data). Utilizing personal data associated with other users may allow the personal cloud storage platform 102 to provide the user 100 with a variety of valuable services including, without limitation, services that compare personal data 126 associated with the user 100 with certain personal data associated with other users.

In one exemplary implementation utilizing the illustrated architecture, a user 100 may have a connected thermostat 112 in their home. The connected thermostat 112 may be in communication with a user's home network and may be configured to periodically transmit personal data 124 relating to the user's power usage to a device-specific cloud (not shown) associated with the manufacturer of the connected thermostat 112. Such information may allow the manufacturer to optimize operation of a user's furnace system and present the user 100 with controls and displays associated with their connected thermostat 112 and/or furnace system. The thermostat manufacturer, however, may not offer any other services to a user 100 in connection with the personal data 124 collected by their connected thermostat 112.

Consistent with embodiments disclosed herein, some or all of the personal data 124 collected by the connected thermostat 112 may be shared with the personal cloud storage platform 102. The user 100 may utilize one or more applications 128 associated with the personal cloud storage platform 102 in connection with their personal data 124. For example, the user 100 may utilize an application that generates an illustration showing temperature in the user's home over time. As discussed above, applications 128 associated with the personal cloud storage platform 102 may further use personal data associated with one or more other users (e.g., when such access and/or use is allowed by the one or more other users). For example, using an application 128 associated with the personal cloud storage platform 102, a user 100 may compare their home temperature and/or energy usage with other users (e.g., users in the same zip code, users having homes of similar size, users with different furnace systems, etc.).

By utilizing their personal data 124 in connection with applications 128 associated with the personal cloud storage platform 102, a user 100 may utilize valuable services not offered by the particular manufacturer of their connected thermostat 112. Moreover, a user 100 may utilize personal data collected by a thermostat associated with a different manufacturer and/or other connected systems and/or devices in connection with their personal cloud storage platform 102. For example, a user 100 may utilize personal data collected by a smart meter in connection with personal data 124 collected by connected thermostat 112 to coordinate heating data (e.g., home temperature information) with energy usage data.

In another exemplary implementation utilizing the illustrated architecture, a user 100 may drive an electric vehicle 108. A variety of personal data 120 may be generated by various systems and/or sensors associated with the vehicle 108 and transmitted to a vehicle-specific cloud 116 associated with a manufacturer of the vehicle 100. For example, personal data 120 comprising GPS location information, acceleration sensor information, braking sensor information, and/or other vehicle operation information may be collected by the vehicle 108 and transmitted to a vehicle manufacturer's cloud storage system 116. While providing information to the vehicle manufacturer that may allow the manufacturer to track the performance of its vehicle 108, such personal data 120 may otherwise be inaccessible by the user 100.

Consistent with embodiments disclosed herein, some and/or all of the personal data 120 collected by the vehicle 108 may be transmitted to a personal cloud storage platform 102 associated with the user 100 (e.g., transferred directly from the vehicle 108 and/or from the vehicle-specific cloud storage system 116 of the vehicle manufacturer). The user 100 may then utilize a variety of applications 128 associated with the personal cloud storage platform 102 in connection with the personal data 120 collected by the vehicle 108. For example, the user 100 may utilize an application 128 that informs the user 100 how much time they spend on their weekly commute. A user 100 may further allow a personal agent, such as that described in the '406 application, access to the personal data 120 in connection with generating a profile of the user's tastes and/or habits (e.g., for use in connection with targeted advertising and/or recommendation services or the like). In this manner, the user 100 may utilize their personal information 120 in a variety of ways not offered by the vehicle manufacturer.

In yet another exemplary implementation utilizing the example architecture shown in FIG. 1, a user 100 may provide a genetic sample to a genetic testing service provider. The genetic testing service provider may sequence the genetic sample and/or a portion thereof and run analyses on the sequence, thereby generating genetic personal data. A user 100, however, may not have access to such genetic personal data or be able to derive value from the data. For example, if a new genetic test becomes available that is not offered by the genetic testing service provider, a user may be unable to utilize their genetic personal data in connection with the new test. Consistent with embodiments disclosed herein, the genetic personal data may be transmitted for storage and management by the user's personal cloud storage platform 102. Utilizing an application 128 associated with the platform 102, a user 100 may perform certain genetic testing using their genetic personal data. Similarly, the user 100 may have control of the sharing of their genetic personal data with others including, for example, entities that may be conducting genetic research trials and/or the like. Implementing trust and privacy management techniques, including policy management of personal data 126, may provide the user 100 with a measure of confidence in the security of their personal data and how it is used by others if the user 100 chooses to share it.

It will be appreciated that a number of variations can be made to the architecture, relationships, and examples presented in connection with FIG. 1 within the scope of the inventive body of work. For example, certain system functionalities described above (e.g., functionalities of systems and/or devices 106, device-specific and application specific cloud storage systems 114, 116, personal cloud storage platform 102, and/or personal cloud management system 104) may be integrated into a single system and/or any suitable combination of systems in any suitable configuration. Thus it will be appreciated that the architecture, relationships, and examples presented in connection with FIG. 1 are provided for purposes of illustration and explanation, and not limitation.

Figure 2:
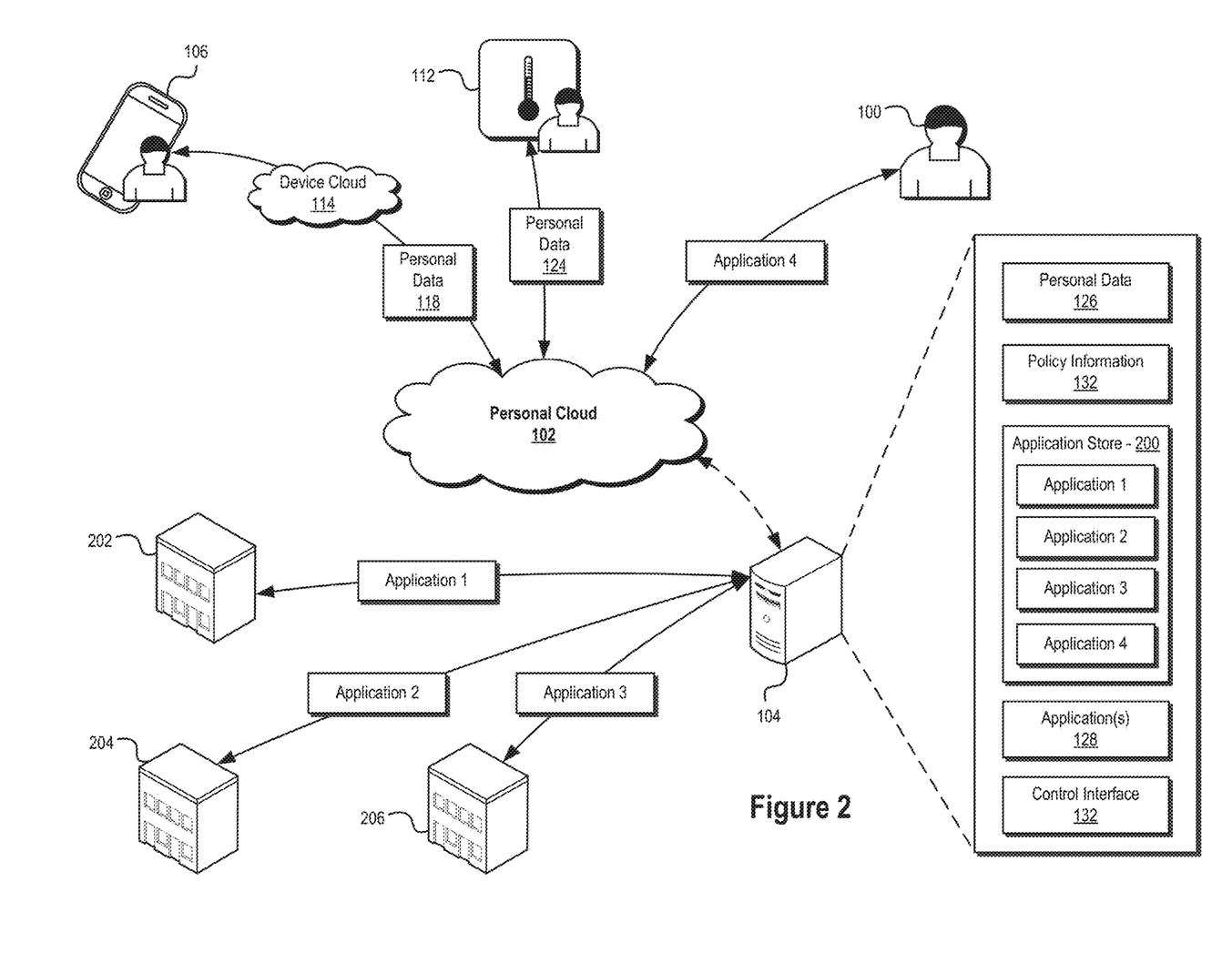
FIG. 2 illustrates generation and distribution of applications used in connection with data associated with a personal cloud platform consistent with embodiments of the present disclosure.

FIG. 2 illustrates generation and distribution of applications for use in connection with personal data 126 associated with a personal cloud storage platform 102 consistent with embodiments of the present disclosure. As discussed above, personal data 126 stored and/or managed by a personal cloud storage platform 102 may be used in connection with one or more applications 128 associated with the platform 102. In certain embodiments, applications may be provided by the user 100 for use in connection with their personal data 126. In further embodiments, applications may be offered by one or more application service providers 202-206 in connection with an application store 200 or other distribution mechanism associated with the personal cloud storage platform 102.

As an example, an application service provider 202 may have developed an application (i.e., "Application 1") that utilizes personal data 126 associated with a user 100 to provide valuable results. The application service provider 202 may not, however, have a data collection infrastructure in place to facilitate use of its application. By offering its application in connection with the application store 200 associated with the personal cloud storage platform 102, the developer may leverage existing personal data collection channels (possibly from a variety of otherwise unrelated sources) to provide valuable services to a user 100 not otherwise available to the user 100. Moreover, the application service provider 202 may generate revenue through purchase of its application by the user 100 via the application store 200.

Figure 3:
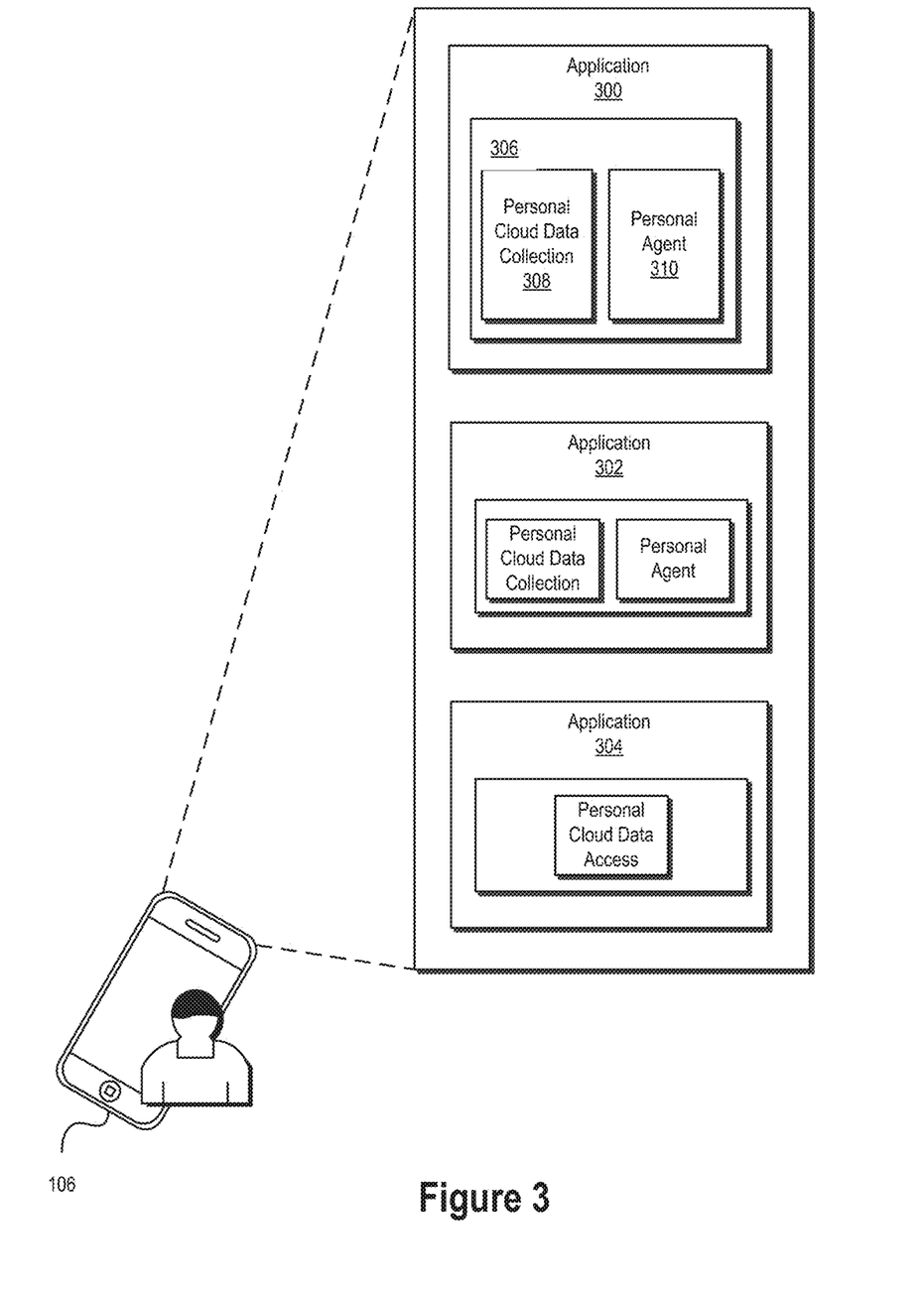
FIG. 3 illustrates integration of certain systems and methods disclosed herein in a plurality of applications executing on a user device consistent with embodiments of the present disclosure.

FIG. 3 illustrates integration of certain systems and methods disclosed herein in a plurality of applications 300-304 executing on a mobile device 106 consistent with embodiments of the present disclosure. In certain embodiments, systems and devices that collect personal data and/or device-specific and/or application-specific cloud storage systems may interface with a personal cloud storage platform using one or more common interfaces for the collection and transmission of personal data. In some embodiments, such common interfaces may be facilitated by one or more trusted software components operating on the systems and devices and/or device-specific and/or application-specific cloud storage systems.

Certain embodiments of the systems and methods disclosed herein may be integrated into a variety of applications executing on a user's device (e.g., using a SDK or the like). For example, as illustrated in FIG. 3, a mobile device 106 may have a variety of installed applications 300-304. The installed applications 300-304 may be provided to the mobile device 106 from a variety of parties and services. For example, a first application may be provided by a streaming movie service, a second application may be provided by a retailer, and a third application may be provided by a targeted offer provider. In some embodiments, the parties and services providing applications 300-304 may be unrelated entities.

Embodiments of the systems and methods disclosed herein may be implemented as trusted components of applications 300-304. In some instances, components of applications 300-304 implementing the systems and methods disclosed herein may be integrated into the applications 300-304 using an appropriate SDK. For example, application 300 may include a trusted component 306 implementing certain embodiments of the systems and methods disclosed herein. The component 306 may include, without limitation, a module implementing personal data collection 308 and a module implementing a personal agent 310. In certain embodiments, functionality associated with the personal data collection module 308 and personal agent 310 modules may be associated with a single module. Component 306 and/or modules 308, 310 may interface with a personal cloud storage platform in connection with communicating collected personal data via an API exposed by the personal cloud storage platform.

The personal data collection module 308 may collect personal data volunteered by a user and/or information collected by monitoring a user's activities in connection with an associated device 106. For example, the personal data collection module 308 may collect, among other things, sensor information, application data, usage and/or activity data, and/or location information. In certain embodiments, the personal data collection module 308 may collect personal data associated with the use of an application 300 with which the module 308 is associated. For example, if application 300 interfaces with one or more device sensors in connection with its operation, such information may be collected by the personal data collection module 308.

The personal agent module 310 may implement functionality associated with a personal agent as disclosed herein. In some embodiments, the modules 308, 310 may allow for collection of personal data while an associated application 300 is actively running on the device 106. In further embodiments, the modules 308, 310 may allow for collection of personal data while an associated application 300 is running in a background of the device 106. It will be appreciated that in some embodiments, a personal agent module may not be included (as illustrated in connection with application 304). It will further be appreciated that in some embodiments, the data that is collected will simply comprise whatever data the application was originally designed to collect, and that data collection module 308 would comprise a mechanism for communicating that data to the user's personal cloud storage account.

Figure 4:
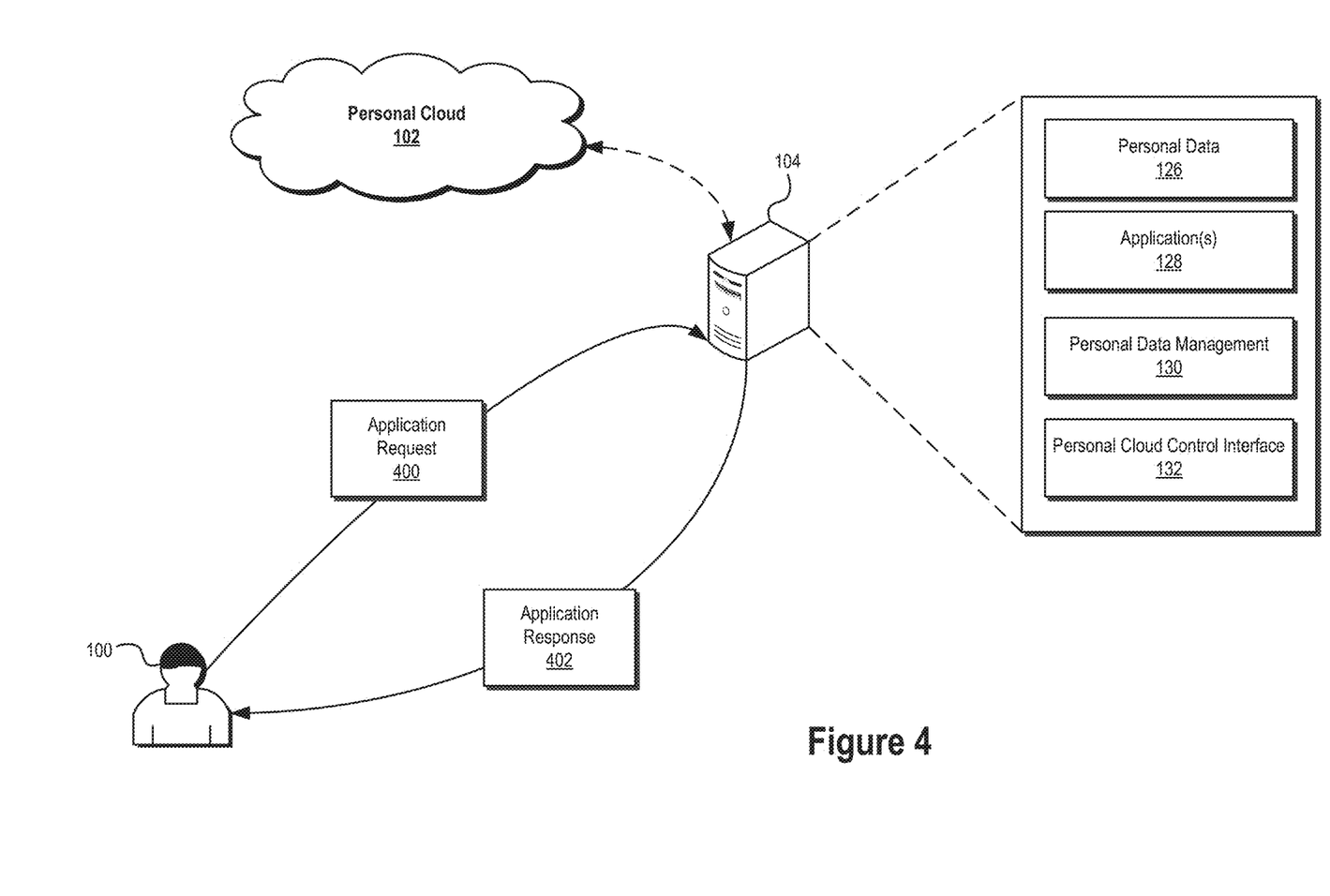
FIG. 4 illustrates generation of a response from an application associated with a personal cloud platform consistent with embodiments of the present disclosure.

FIG. 4 illustrates generation of a response from an application 128 associated with a personal cloud storage platform 102 consistent with embodiments of the present disclosure. In connection with interacting with an application 128 utilizing their personal data 126, a user 100 may issue one or more application requests 400 to the personal cloud storage platform 102 and/or an associated personal cloud management system 104. For example, a user 100 may issue an application request 400 via the personal cloud control interface 132 querying an application 128 to operate on the user's data (e.g., to provide a visualization of certain data, to perform a calculation on certain data, to analyze certain data, to offer services based on review of certain data, and/or the like).

In some embodiments, the personal cloud storage platform 102 and/or associated personal cloud management system 104 may make a determination whether the requested use of the personal data 126 is allowed by one or more policies 134 associated with the data 126. In other embodiments, no separate determination is performed, as the user is assumed to be authorized to access and/or grant an application access to the user's data. If the requested use of the personal data 126 is not allowed, the request 400 may be denied. If, however, the requested use of the personal data 126 is allowed, the queried application 128 may generate a response 402 to the request 400 and transmit the response 402 to the user 100. Although FIG. 4 shows an embodiment in which the application 128 runs on the cloud storage platform, in other embodiments, the application 128 may run locally on a device associated with the user, and simply access data stored on the cloud storage platform.

Figure 5:
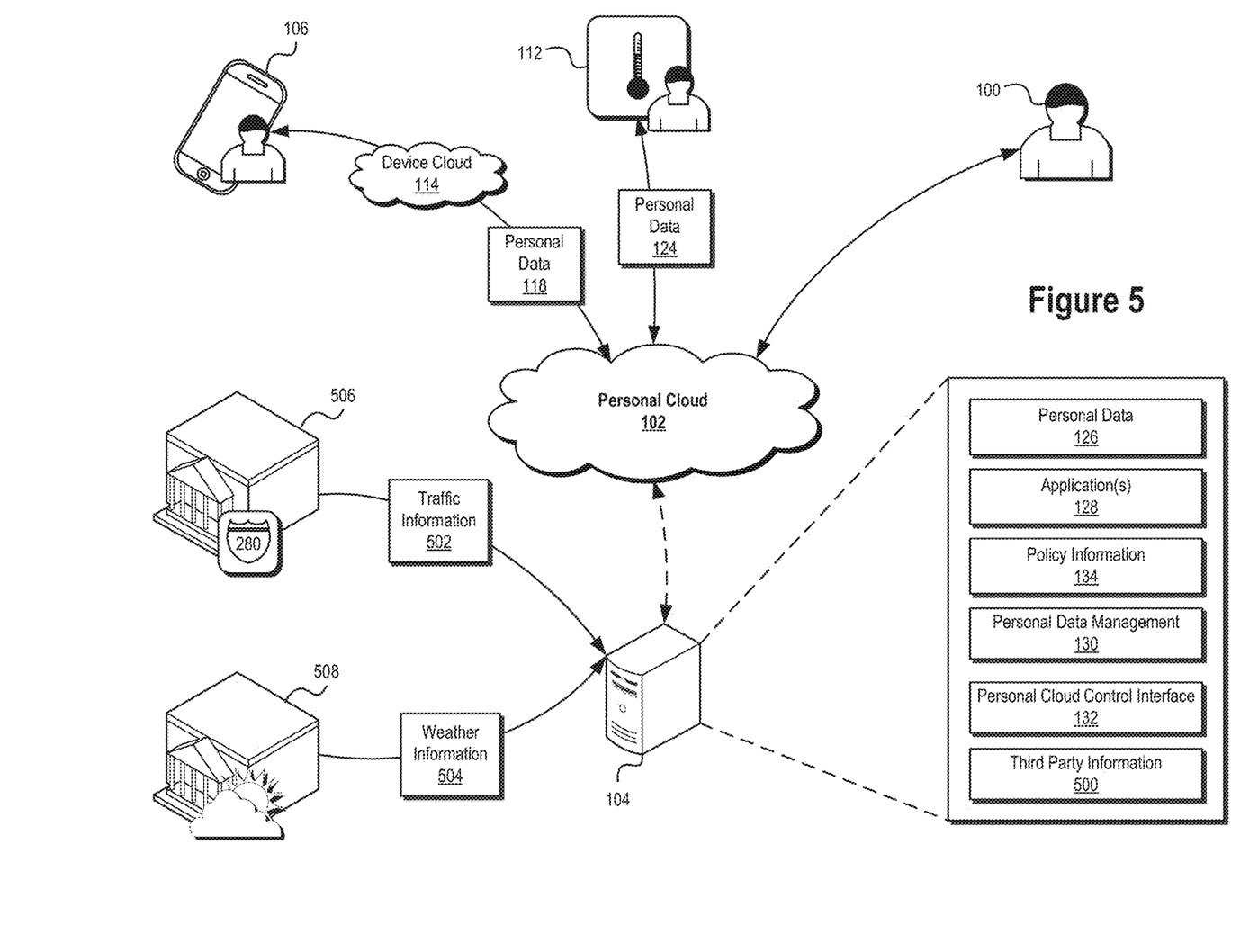
FIG. 5 illustrates integration of third party information in connection with a personal cloud platform consistent with embodiments of the present disclosure.

FIG. 5 illustrates integration of third party information 500 in connection with a personal cloud storage platform 102 consistent with embodiments of the present disclosure. As discussed above, in some embodiments, applications 128 associated with a personal cloud storage platform 102 may utilize personal data associated with one or more other users or groups of users when such use is permitted by others. Similarly, applications 128 associated with a personal cloud storage platform 102 may use third party information 500 provided by one or more third-party service providers 506-508 in connection with providing services to the user 100.

As an example, historical location information included in personal data 126 collected by a user device 108 associated with a user 100 may indicate that the user 100 typically commutes along a specific route. Based on real-time traffic information 502 provided to the personal cloud storage platform 102 by a traffic information service provider 506 indicating a vehicle accident along the user's commuting route, an application 128 associated with personal cloud storage platform 102 may notify the user 100 of adverse traffic conditions and suggest alternative routes.

In another example, weather information 504 may be provided to the personal cloud storage platform 102 by a weather information service provider 508. The weather information 504 may be utilized in connection with personal data 126 associated with a connected thermostat 112 of the user 100 to correlate measured indoor house temperatures with outdoor weather patterns. By utilizing third party information 500 in connection with a user's personal data 126, a variety of valuable services may be offered to the user 100 by the personal cloud storage platform 102 and/or applications 128 executing thereon. It will be appreciated that a variety of third party information 500 may be utilized in connection with applications 128 associated with the personal cloud storage platform 102, and that any suitable third party information 500 may be utilized in connection with the embodiments disclosed herein.

Figure 6:
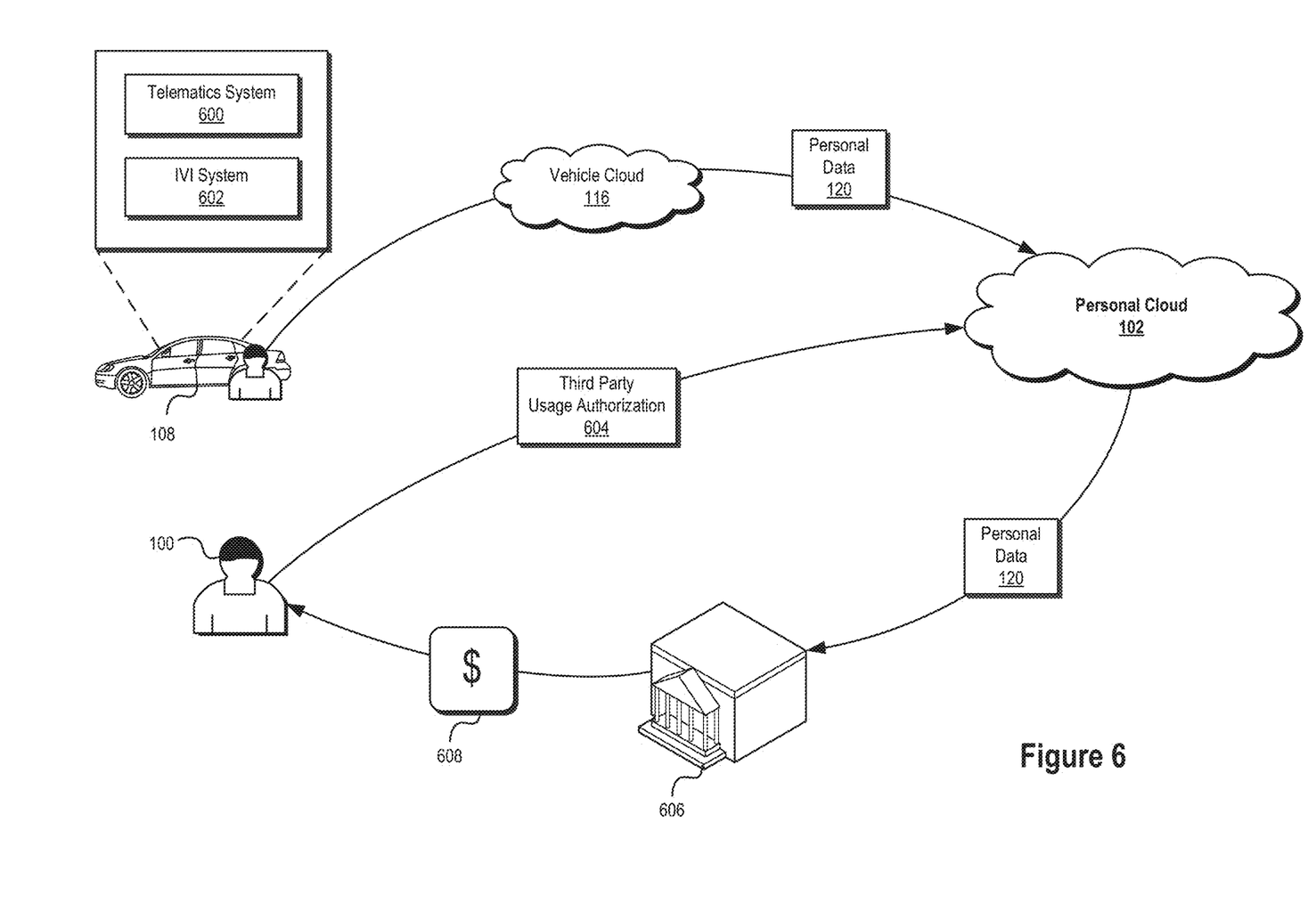
FIG. 6 illustrates an example of an authorized third party use of personal data associated with a personal cloud platform consistent with embodiments of the present disclosure.

FIG. 6 illustrates an example of an authorized third party use of personal data 120 associated with a personal cloud storage platform 102 consistent with embodiments of the present disclosure. In some embodiments, policies associated with a user's personal data 120 may articulate how the personal data 120 may be distributed to and/or used by one or more other users and/or third parties. A user 100 may allow a third party service provider to access their personal data 120 from their personal cloud storage platform 102 and use the personal data 120 in one or more ways specified by policy in exchange for providing something of value to the user 100.

In the illustrated example, a user 100 may operate a vehicle 108. The vehicle may include a telematics system 600, an IVI system 602, and/or a variety of other systems and/or sensors that may gather personal data 120 regarding, e.g., the user's driving habits. For example, a telematics system 600, an IVI system 602, and/or other systems and/or sensors may collect information regarding travel patterns of the vehicle 108, speed of the vehicle 108, acceleration of the vehicle 108, and/or the like. Such information may be included in personal data 120 communicated to a vehicle-specific cloud storage system 116 and/or a personal cloud storage platform 102 associated with the user 100.

An insurance service provider 606 may offer certain valuable services to the user 100 in exchange for receiving personal data 120 relating to the user's drivers habits. For example, the insurance service provider 606 may offer a discount on insurance services if the user 100 agrees to allow the insurance service provider 606 access to certain personal data 120 associated with the user's driving habits. A user may wish to act on this offer and, accordingly, may transmit a third party usage authorization 604, which in certain embodiments may comprise policy information associated with the personal data 120, to the personal cloud storage platform 102 directing the platform 102 to allow the insurance service provider 606 to access the personal data 120. The personal data 120 may be sent to the insurance service provider 606 (and/or the insurance provider may be granted access to the relevant information via the cloud storage platform 102) that, in turn, may provide the user with a discount 608 on their services. In this manner, a user 100 may utilize services in connection with their personal data 126 not necessarily offered in connection with the vehicle-specific cloud storage system 116. Moreover, the insurance service provider 606 may use an existing personal data collection infrastructure in connection with its services without needing to provide such infrastructure (e.g., by distributing driving behavior tracking devices to users or the like).

Figure 7:
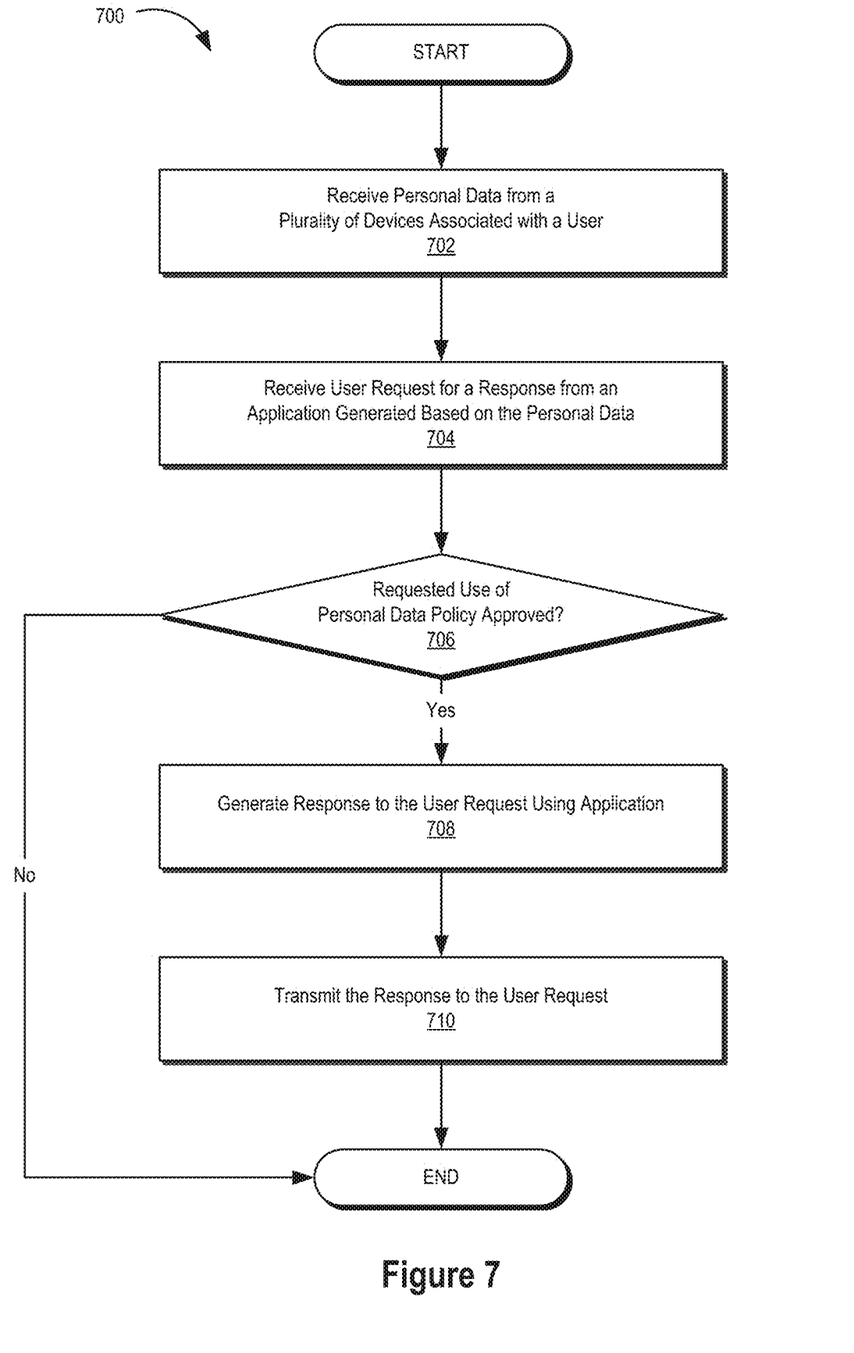
FIG. 7 illustrates a flow chart of an exemplary method of generating a response from an application associated with a personal cloud platform consistent with embodiments of the present disclosure.

FIG. 7 illustrates a flow chart of an exemplary method 700 of generating a response from an application associated with a personal cloud consistent with embodiments of the present disclosure. The illustrated method 700 may be implemented in a variety of ways, including using software, firmware, hardware, and/or any combination thereof. In certain embodiments, the method 700 and/or its constituent steps may be performed by a system and/or device associated with a user, a personal cloud storage platform, a personal cloud management system associated with the same, and/or any other suitable system or systems.

At 702, personal data may be received from a plurality of systems and/or devices associated with a user. The personal data may further be provided directly by the user. In certain embodiments, the personal data may be received directly from the systems and/or devices associated with the user. In further embodiments, the personal data may alternatively or in addition be received from one or more application-specific and/or device-specific cloud storage systems storing personal data provided by one or more applications and/or devices associated with the user.

A request for a response from an application may be received at 704. For example, the user may request that a certain application perform certain operations on data stored in the user's personal cloud storage. The application may, for example, be one that the user acquired from an app store, from the cloud service, or in some other manner. In certain embodiments, the requested response may be generated based on the personal data received at 702. For example, the requested response may comprise a visualization based on the personal data received at 702. In further embodiments, the requested response may be a response generated in connection with the application performing certain analytics on the personal data received at 702. In certain embodiments, the application and/or its associated response may comprise a service not otherwise offered to the user from an application-specific and/or device-specific cloud storage system. It will be appreciated that a wide variety of responses and/or applications may be involved in the request received at 704, and that any suitable response and/or application may be utilized in connection with the disclosed embodiments.

A determination may be made at 706 whether the requested response is permitted based on policy information associated with the personal data. In certain embodiments policy information associated with the personal data may encode, among other things, rules pertaining to the use and/or distribution of the personal data. For example, policy information may specify whether an application involved in the request received at 704 is permitted to access to the personal data and/or use the personal data in a particular manner. In some embodiments, the policy information is expressed and enforced using technologies such as those described in the '693 application and/or '387 patent, although it will be appreciated that any suitable policy expression and enforcement technologies could be used. Moreover, it will be appreciated that while the example shown in FIG. 7 shows the use of policy information to govern the use of data stored on a personal cloud storage platform, in other embodiments, policy information may not be used. For example, the data could be stored on the cloud, and access could be controlled using conventional mechanisms (e.g., password protection to access the user's account, etc.).

Returning to FIG. 7, if the use of the personal data is not permitted by associated policy information, the method 700 may terminate. If, however, the requested use of the personal data is permitted by policy, the method may continue to 708. At 708, a response to the request received at 704 may be generated by the application. The response may then be transmitted to the requesting user and/or a system or device associated with the user at 710.

Figure 8:
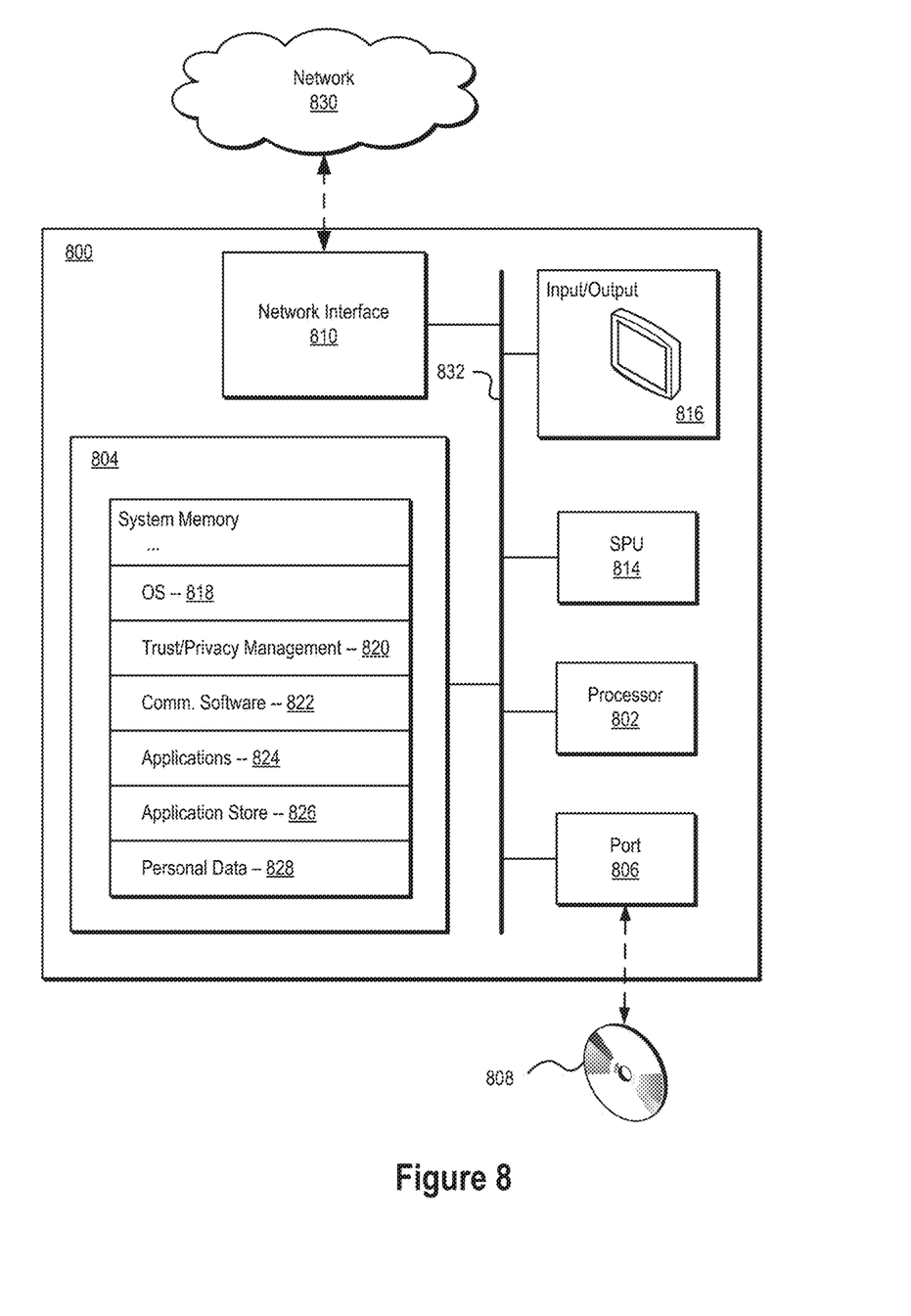
FIG. 8 illustrates an exemplary system that may be used to implement certain embodiments of the systems and methods disclosed herein.

FIG. 8 illustrates an exemplary system 800 that may be used to implement embodiments of the systems and methods disclosed herein. The exemplary system 800 may comprise a system and/or device associated with a user, a personal cloud management system or another system associated with a cloud storage platform, and/or any other system configured to implement embodiments of the systems and methods disclosed herein. As illustrated in FIG. 8, the system 800 may include: a processing unit 802; system memory 804, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 802; a port 806 for interfacing with removable memory 808 that may include one or more diskettes, optical storage mediums, flash memory, thumb drives, USB dongles, compact discs, DVDs, etc., and/or other non-transitory computer-readable storage mediums; a network interface 810 for communicating with other systems via one or more network connections 830 using one or more communication technologies; a user interface 816 that may include a display and/or one or more input/output devices such as, for example, a touchscreen, a keyboard, a mouse, a track pad, and/or the like; and one or more busses 832 for communicatively coupling the elements of the system 800. In certain embodiments, the system 800 may include and/or be associated with one or more sensors (not shown) configured to collect various device data, including, for example, any of the types of sensors disclosed herein.

In some embodiments, the system 800 may, alternatively or in addition, include a secure processing unit 814 that is protected from tampering by a user of system 800 or other entities by utilizing secure physical and/or virtual security techniques. An SPU 814 can help enhance the security of sensitive operations such as personal information management, trusted credential and/or key management, privacy and policy management, and/or other aspects of the systems and methods disclosed herein. In certain embodiments, the SPU 814 may operate in a logically secure processing domain and be configured to protect and operate on secret information. In some embodiments, the SPU 814 may include internal memory storing executable instructions or programs configured to enable to the SPU 814 to perform secure operations.

The operation of the system 800 may be generally controlled by a processing unit 802 and/or a SPU 814 operating by executing software instructions and programs stored in the system memory 804 (and/or other computer-readable media, such as removable memory 808). The system memory 804 may store a variety of executable programs or modules for controlling the operation of the system 800. For example, the system memory 804 may include an operating system ("OS") 818 that may manage and coordinate, at least in part, system hardware resources and provide for common services for execution of various applications, and/or a trust and privacy management system 820 for implementing trust and privacy management functionality including protection and/or management of personal data through management and/or enforcement of associated policies. The system memory 804 may further include, without limitation, communication software 822 configured to enable in part communication with and by the system 800, applications 824 (e.g., installed applications utilized in connection with personal data 828), an application store 826 configured to enable a user to select and/or install applications they wish to utilize in connection with their personal data 828, personal data 828 associated with a user, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause a computer system to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause a computer system to perform a method according to the instructions. The non-transitory storage medium may take any form capable of storing processor-readable instructions on a non-transitory storage medium. A non-transitory storage medium may be embodied, for example, by a compact disk, digital-video disk, a magnetic tape, a magnetic disk, flash memory, integrated circuits, optical memory, and/or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method of managing personal data associated with a user, the method performed by a cloud storage system comprising a processor and a non-transitory computer-readable storage medium storing instructions that, when executed by the processor, cause the system to perform the method, the method comprising:

receiving, at an interface of the cloud storage system from a plurality of remote systems associated with the user, personal data related to the user;

receiving, at the interface of the cloud storage system from a system associated with an application service provider, an application for execution by the cloud storage system;

receiving, at the interface of the cloud storage system from at least one remote system of the plurality of remote systems, policy data generated by the user associated with the received personal data, the policy data encoding one or more rules pertaining to the use and/or distribution of the personal data by the cloud storage system;

receiving, at the interface from a requesting system, an application request, the application request comprising a request for a response to be generated by the application executing on the cloud storage system based on the received personal data;

determining that the request is denied based on a determination that the policy data associated with the received personal data indicates that distribution of personal data associated with the request is not allowed; and denying the application request at least in part based on said determination.

2. A non-transitory computer-readable storage medium storing executable instructions that, when executed by a processor of a cloud storage system, cause the processor to perform a method for managing personal data associated with a user comprising:

receiving, at an interface of the cloud storage system from a plurality of remote systems associated with the user, personal data related to the user;

receiving, at the interface of the cloud storage system from a system associated with an application service provider, an application for execution by the cloud storage system;

receiving, at the interface of the cloud storage system from at least one remote system of the plurality of remote systems, policy data generated by the user associated with the received personal data, the policy data identifying at least one permitted operation that may be performed using the received personal data;

receiving, at the interface from a requesting system, an application request, the application request comprising a request for a response to be generated by the application executing on the cloud storage system based on the received personal data;

determining that the request is permitted based on a determination that the policy data associated with the received personal data identifies that an operation associated with the request comprises a permitted operation identified by the policy data;

generating a response to the application request using the application based on the received personal data; and transmitting, from the interface, the response to the requesting system.

3. The method of claim 1, wherein the plurality of remote systems comprise at least one mobile device associated with the user.

4. The method of claim 1, wherein the plurality of remote systems comprise at least one remote cloud storage system associated with the user.

5. The method of claim 1, wherein the personal data comprises activity data relating to activities performed by the user with one or more of the plurality of remote systems.

6. The method of claim 1, wherein the personal data comprises data collected by a plurality of trusted software components executing on one or more of the plurality of remote systems.

7. The method of claim 1, wherein the request further comprises a request for the response to be generated based further on information provided by a third party service.

8. The method of claim 1, wherein the requesting system comprises at least one of the at least one remote system of the plurality of remote systems associated with the user, the system associated with the application service provider, and a third party system.

9. The non-transitory computer-readable storage medium of claim 2, wherein the plurality of remote systems comprise at least one mobile device associated with the user.

10. The non-transitory computer-readable storage medium of claim 2, wherein the plurality of remote systems comprise at least one remote cloud storage system associated with the user.

11. The non-transitory computer-readable storage medium of claim 2, wherein the personal data comprises activity data relating to activities performed by the user with one or more of the plurality of remote systems.

12. The non-transitory computer-readable storage medium of claim 2, wherein the personal data comprises data collected by a plurality of trusted software components executing on one or more of the plurality of remote systems.

13. The non-transitory computer-readable storage medium of claim 2, wherein the request further comprises a request for the response to be generated based further on information provided by a third party service.

14. The method of claim 3, wherein the personal data comprises data obtained by one or more sensors of the mobile device.

15. The method of claim 3, wherein the requesting system comprises at least one of the at least one remote system of the plurality of remote systems associated with the user, the system associated with the application service provider, and a third party system.

16. The non-transitory computer-readable storage medium of claim 9, wherein the personal data comprises data obtained by one or more sensors of the mobile device.

17. The method of claim 7, wherein the method further comprises:
    accessing, by the interface, the information provided by the third party service, and wherein generating the response is further based on the information provided by the third party service.

18. The non-transitory computer-readable storage medium of claim 13, wherein the method further comprises:
    accessing, by the interface, the information provided by the third party service, and wherein generating the response is further based on the information provided by the third party service.

19. The method of claim 14, wherein the personal data comprises location data obtained by one or more location sensors of the mobile devices.

20. The non-transitory computer-readable storage medium of claim 16, wherein the personal data comprises location data obtained by one or more location sensors of the mobile devices.

* * * * *